US010293413B2

(12) United States Patent
Schuffenhauer et al.

(10) Patent No.: US 10,293,413 B2
(45) Date of Patent: May 21, 2019

(54) HYDRAULIC EXPANSION CHUCK

(71) Applicant: KENNAMETAL INC., Latrobe, PA (US)

(72) Inventors: Michael Schuffenhauer, Furth (DE); Josef Herud, Herzogenaurach (DE)

(73) Assignee: KENNAMENTAL INC, Latrobe, PA (US)

( * ) Notice: Subject to any disclaimer, the term of this patent is extended or adjusted under 35 U.S.C. 154(b) by 77 days.

(21) Appl. No.: 14/797,718

(22) Filed: Jul. 13, 2015

(65) Prior Publication Data
US 2015/0306676 A1 Oct. 29, 2015

Related U.S. Application Data

(63) Continuation of application No. 13/062,791, filed as application No. PCT/EP2009/007062 on Oct. 2, 2009, now Pat. No. 9,079,254.

(30) Foreign Application Priority Data

Oct. 2, 2008 (DE) ........................ 10 2008 050 213

(51) Int. Cl.
B23B 31/117 (2006.01)
B23B 31/30 (2006.01)
B23B 31/02 (2006.01)

(52) U.S. Cl.
CPC .......... B23B 31/305 (2013.01); B23B 31/028 (2013.01); B23B 31/1176 (2013.01);
(Continued)

(58) Field of Classification Search
CPC ... B23B 31/305; B23B 31/30; B23B 31/1176; B23B 31/1177; B23B 31/1175;
(Continued)

(56) References Cited

U.S. PATENT DOCUMENTS 2,460,889 A 2/1949 Larsen
2,797,603 A 7/1957 Atherholt et al.
(Continued)

FOREIGN PATENT DOCUMENTS

DE 44 16 537 C1 11/1995
DE 100 07 074 A1 9/2001
(Continued)

OTHER PUBLICATIONS

Machine Translation, WIPO document, WO 01060556, "Expansion Chuck Tool", Clauss. H., Aug. 2001.*
(Continued)

Primary Examiner — Eric A Gates
Assistant Examiner — Chwen-Wei Su
(74) Attorney, Agent, or Firm — Matthew S. Bedsole

(57) ABSTRACT

The invention relates to a hydraulic expansion chuck having an end on the tool side; and an end on the machine side. A shaft is disposed on the end on the machine side for clamping the expansion chuck in a machine tool. An expanding bushing is disposed on the end on the tool side and surrounded by a pressure chamber and can be radially deformed for clamping a tool under the action of a pressure medium received in the pressure chamber.

9 Claims, 3 Drawing Sheets

(52) U.S. Cl.
 CPC ........... *B23B 31/1178* (2013.01); *B23B 31/30* (2013.01); *Y10T 279/1216* (2015.01); *Y10T 279/1241* (2015.01); *Y10T 279/3487* (2015.01)

(58) Field of Classification Search
 CPC ............... B23B 31/1178; B23B 31/028; Y10T 279/1241; Y10T 279/12; Y10T 279/3487
 See application file for complete search history.

(56) References Cited

U.S. PATENT DOCUMENTS

| | | | |
|---|---|---|---|
| 3,335,569 A | | 8/1967 | Atherholt, Sr. |
| 3,388,917 A | * | 6/1968 | Winnen ................ B23B 31/305 279/4.03 |
| 3,516,681 A | * | 6/1970 | Cox ..................... B23B 31/305 279/4.02 |
| 3,677,559 A | | 7/1972 | Andre et al. |
| 3,830,509 A | | 8/1974 | Weber |
| 4,934,672 A | * | 6/1990 | Craft .................... B23B 31/305 269/22 |
| 5,286,042 A | | 2/1994 | Laube |
| 7,316,403 B2 | | 1/2008 | Andre et al. |
| 2007/0145692 A1 | | 6/2007 | Herud |

FOREIGN PATENT DOCUMENTS

| | | | | |
|---|---|---|---|---|
| EP | 0329633 A2 | * | 8/1989 | ........... B23B 31/266 |
| EP | 1 882 537 A1 | | 1/2008 | |
| JP | 61090843 A | | 5/1986 | |
| WO | WO 9507791 A1 | * | 3/1995 | ............. B23B 31/00 |
| WO | WO 9900604 A1 | * | 1/1999 | ........... B23B 31/305 |
| WO | 01/60556 A1 | | 8/2001 | |
| WO | 2005/097383 A1 | | 10/2005 | |

OTHER PUBLICATIONS

Machine translation, Japan patent document, JP-6190843, Sekimoto et al., May 9, 1986.*

German Patent Office, "Office Action, German Patent Application No. 10 2008 050 213.8-14", dated Nov. 18, 2011, 5 pages.

* cited by examiner

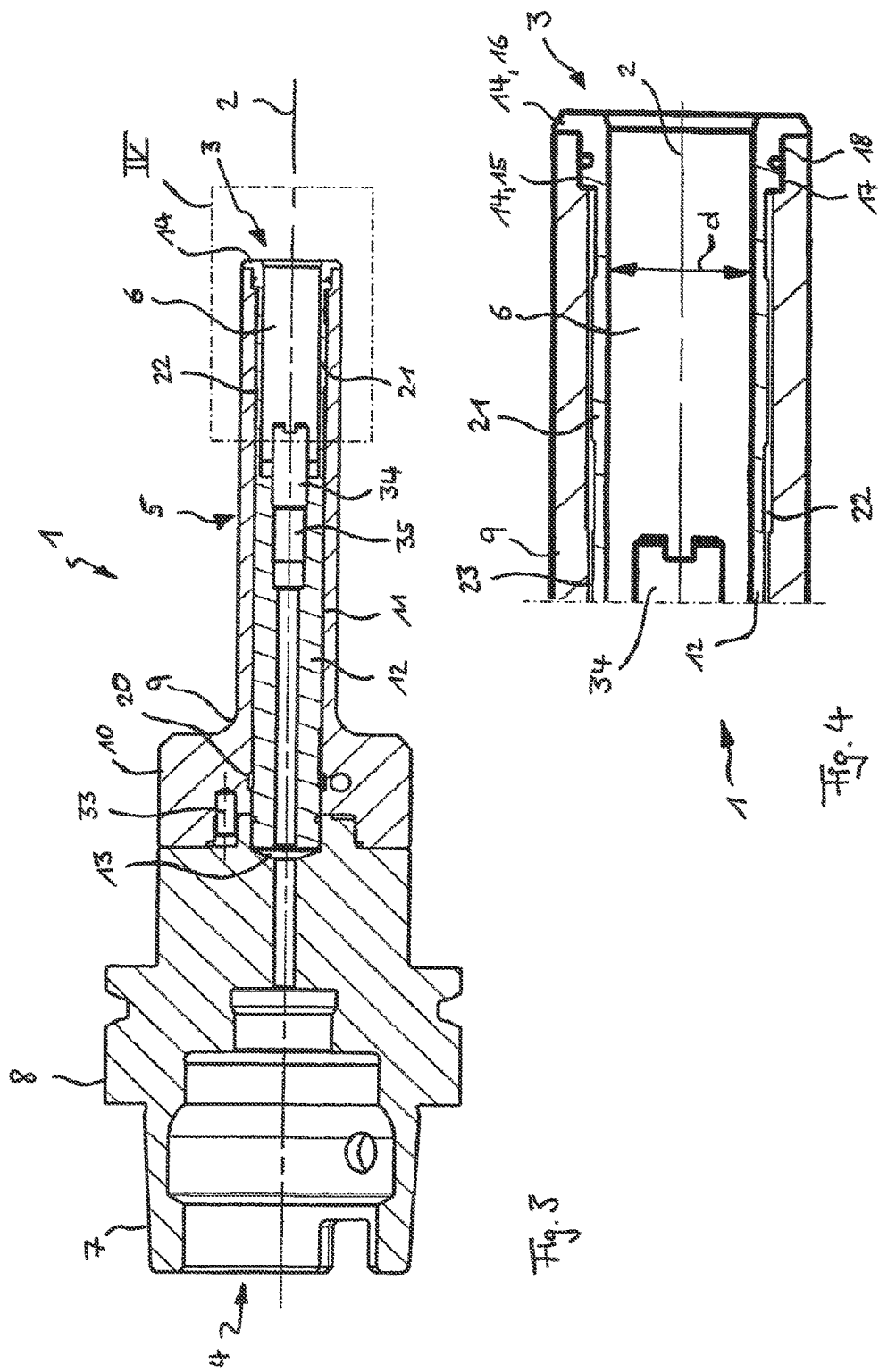

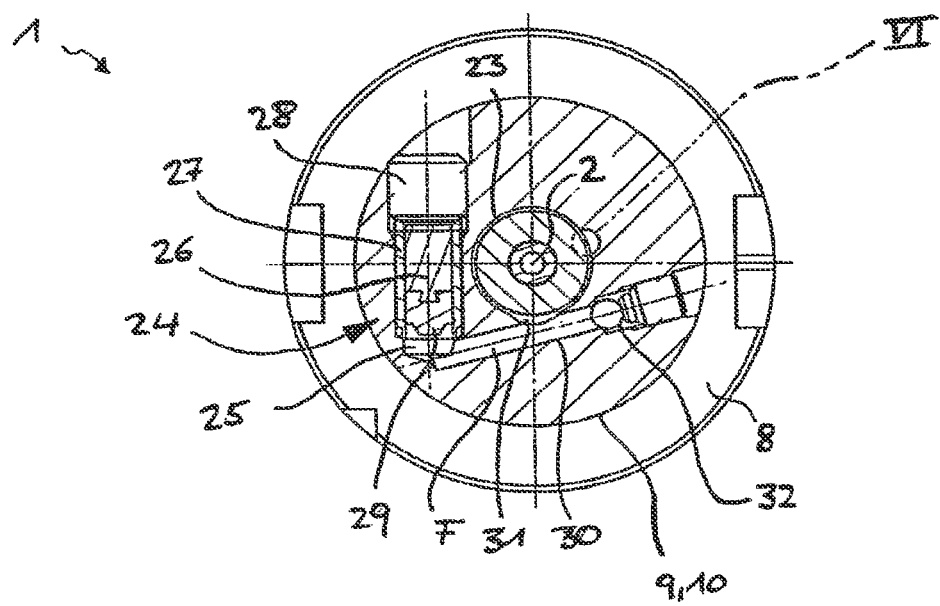
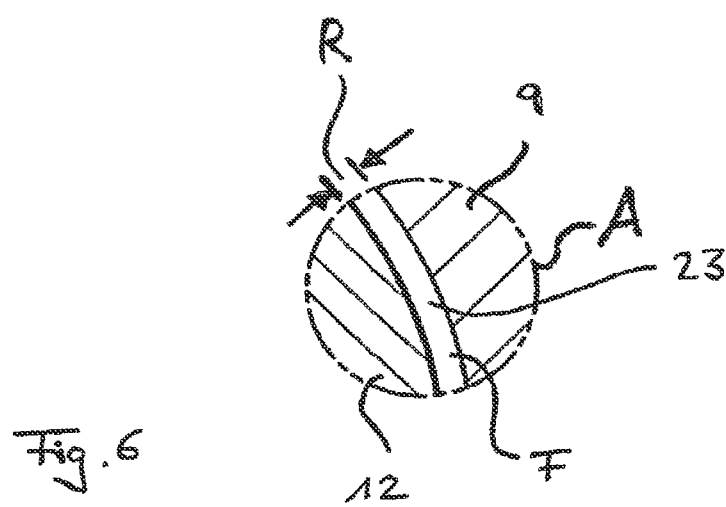

HYDRAULIC EXPANSION CHUCK

CONTINUING APPLICATION DATA

This application is a continuation of co-pending U.S. application Ser. No. 13/062,791, filed on Mar. 25, 2011, which is a '371 U.S. National Phase filing of International Patent Application No. PCT/EP2009/007062, filed on Oct. 2, 2009, which claims priority from Germany Patent Application No. 10 2008 050 213.8, filed on Oct. 2, 2008, all of which are incorporated by reference herein.

BACKGROUND OF THE INVENTION

Field of the Invention

The invention relates to a hydraulic expansion chuck for clamping in a tool, in particular a drill or milling cutter.

Description of the Related Art

A chuck serves to connect a rotationally driven tool to the drive spindle of a machine tool. A chuck therefore has a pronounced chuck axis, about which the chuck and the tool which is clamped therein are rotated during operation. In the direction of this chuck axis, a chuck always has a tool-side end which is provided for receiving the tool and a machine-side end which is configured for connecting the chuck to the drive spindle of the machine tool. At the machine-side end, a chuck of this type as a rule carries a conical shaft, in particular a steep shaft, what is known as an HSC (hollow shaft cone) shaft or the like.

What are known as the hydraulic expansion chucks form a category known per se of chucks. In an expansion chuck of this type, the receptacle for the tool is formed by a thin-walled expansion bushing. The expansion bushing is surrounded by a pressure chamber which is filled with a pressure medium, for example an oil. The expansion bushing is configured in such a way that, if pressure is applied to the pressure medium, it is elastically deformed radially and in the process clamps in the inserted tool. A hydraulic expansion chuck has the advantage, in particular, that it damps jolts and vibrations which occur during operation. As a result, a particularly high surface quality and a long service life of the tool are achieved during machining.

WO 2005/097383 has disclosed a hydraulic expansion chuck of this type which can advantageously be used, in particular, in mold and die construction and has a long and narrow design which is required for this purpose. The known expansion chuck has a basic body which carries, at its tool-side end, the shaft which is provided for clamping the expansion chuck in the machine tool. An approximately bell-shaped clamping sleeve which is drawn out at the free end to form an elongate and narrow neck region is placed onto the basic body on the tool side. Here, a thin-walled and hollow-cylindrical projection of the basic body extends within the clamping sleeve as far as its free end, the pressure chamber being formed at this end between the projection of the basic body and the clamping sleeve. Here, the expansion bushing is formed in the inner region of the basic body, which inner region adjoins the pressure chamber. Here, a narrow annular gap which is concentric with respect to the chuck axis is formed between the outer circumference of the basic body and the clamping sleeve, which annular gap, as a pressure transfer channel, connects the pressure chamber to a pressure generation unit, the latter being accommodated in a widened, machine-side section of the clamping sleeve.

The known hydraulic expansion chuck is advantageous for producing very long, narrow chuck designs. However, the production of the expansion chuck is comparatively complicated. This relates, in particular, to the production of the thin-walled projection of the basic body and the pressure-tight soldering of the clamping sleeve to the basic body.

DE 100 07 074 A1 has disclosed a further expansion chuck. Said expansion chuck comprises a single piece basic body, on the machine-side end of which once again a shaft is formed, while the tool-side end of the basic body forms a clamping sleeve. Here, an inner sleeve which is separate from the basic body, and therefore also from the clamping sleeve, inserted into the clamping sleeve, which inner sleeve contains an expansion bushing and delimits, on the inner side, a pressure chamber which surrounds it. At its tool-side end, the inner sleeve is provided with an outwardly protruding annular collar which overlaps with the clamping sleeve. Here, the annular collar extends over part of the radial width of the clamping sleeve which surrounds the annular collar on the outside. The interface which is formed between the annular collar and the clamping sleeve otherwise opens into the tool-side end face of the expansion chuck.

SUMMARY OF THE INVENTION

The invention is based on the object of specifying an improved hydraulic expansion chuck which is advantageous, in particular, for realizing long and narrow designs.

According to the invention, this object is achieved by the features of claim 1. The expansion chuck according to the invention comprises a tool-side end and a machine-side end, a shaft for clamping the expansion chuck in a machine tool being arranged at the machine-side end, and an expansion bushing being arranged at the tool-side end, which expansion bushing is surrounded by a pressure chamber and can be deformed radially to clamp in a tool under the action of pressure medium which is accommodated in the pressure chamber. The machine-side end of the expansion chuck is formed by a basic body which also carries the shaft and to which, on the tool side, a clamping sleeve which adjoins the pressure chamber on the outside is attached rigidly.

According to the invention, an inner sleeve is inserted into the interior of the clamping sleeve, which inner sleeve is manufactured as a separate component and is therefore not integrally connected to either the clamping sleeve or the basic body. Said inner sleeve contains the expansion bushing and delimits the pressure chamber on the inside. At its tool-side end, the inner sleeve is provided with a radially outwardly protruding annular collar, by way of which the inner sleeve overlaps with the clamping sleeve in the radial direction. The annular collar is therefore designed in such a way that it protrudes beyond the inner circumference of the clamping sleeve.

The substantially three part production of the expansion chuck (in the form of the basic body, the clamping sleeve and the separate inner sleeve) is substantially simplified in terms of manufacturing technology in comparison with the known solution, in which a projection which is connected integrally to the basic body is provided instead of the separate inner sleeve. The pressure-tight soldering of the expansion chuck at the machine-side edge of the pressure conducting region is also simplified substantially as a consequence of the three piece design, especially since the machine-side part of the clamping sleeve and of the inner sleeve which pushed into it is directly accessible before mounting of the basic body. At the same time, the connecting point between the clamping sleeve and the inner sleeve is protected by the annular collar, by way of which the inner sleeve overlaps the clamping sleeve at the machine-side end of the expansion chuck. In particular, damage to this connecting region as a result of friction with chips or the like is avoided effectively.

In order to make the expansion chuck particularly insensitive to chip abrasion, the annular collar extends over the entire width of the clamping sleeve. Here, the annular collar terminates approximately fleshly with the outer circumference of the clamping sleeve, in particular on the outside. As a result, an interface formed between the clamping sleeve and the inner sleeve on the outer side of the expansion chuck does not open axially, but rather radially at the outer circumference of the expansion chuck. As a result, the transport of chips takes place approximately perpendicularly with respect to the outer region of the interface, as a result of which the chips can exert a comparatively low force on the chuck material in the opening region of the interface.

In order to improve the protective effect, in one advantageous embodiment of the invention, in longitudinal section through the expansion chuck, the annular collar is provided with an at least two step contour which bears sealingly with a complementarily shaped recess against the tool-side edge of the clamping sleeve. As a consequence of this contour, an interface is therefore formed in the region of the annular collar between the clamping sleeve and the inner sleeve, which interface is kinked at least twice in longitudinal section, in particular in each case by approximately 90°, approximately in the manner of a labyrinth seal. Here, at least in a part region of the interface, the clamping sleeve is connected to the inner sleeve with a material-to-material fit, namely is preferably soldered, in particular brazed.

A particularly stable connection of the clamping sleeve to the inner sleeve is achieved as a consequence of the "labyrinthine" profile of the interface and as a consequence of the annular collar which protrudes beyond the clamping sleeve. This connection is stable both against the pressures which act from the inside, that is to say from the pressure chamber, and against the loads which act from the outside on the tool-side end of the expansion chuck, namely, in particular, the axial pressure which is transmitted from the tool to the inner sleeve, including the vibrations which occur during operation of the expansion chuck. In addition, the connecting face is also protected effectively against the abrasion forces as a result of chips, which abrasion forces are exerted on the tool-side end of the expansion chuck from the outside.

The clamping sleeve preferably has a through hole which penetrates the inner sleeve completely. The inner sleeve is preferably even lengthened in comparison with the length of said through hole and therefore protrudes beyond the machine-side end of the through hole. The inner sleeve therefore engages in a positively locking manner into the basic body which adjoins the clamping sleeve on the machine side.

In order to generate a pressure which deforms the expansion bushing hydraulically, the chuck expediently has a pressure generation unit which is arranged offset axially with respect to the expansion bushing and the pressure chamber which surrounds it. In order to transmit the applied pressure over the axial distance between the pressure chamber and the pressure generation unit, the expansion chuck contains a pressure conducting system which is advantageously formed by an annularly closed gap or channel which is arranged concentrically with regard to the chuck axis.

In comparison with a customary hole as pressure conducting system, an annular gap with a comparable cross-sectional area has a generally substantially smaller radial extent. An annular gap with a sufficient cross-sectional area for pressure transmission can therefore also be attached in a space-saving manner in the case of an extremely narrow expansion chuck. Moreover, the stresses introduced under pressure application into the material of the chuck in the region of the annular pressure conducting system are always rotationally symmetrical with regard to the chuck axis, with the result that no asymmetrical deformation of the expansion chuck can occur and therefore the true running of the expansion chuck during operation is not impaired.

An annular and concentric pressure conducting system is particularly simple to produce using the three part production of the expansion chuck, in which the annular gap is formed between the inner sleeve and the clamping sleeve.

A geometry of the expansion chuck which is advantageous with regard to saving space is achieved by the fact that the pressure generation unit is arranged in the clamping sleeve. Here, a pressure generation unit with a piston/cylinder system is advantageous both with regard to simple production and with regard to a simple handling capability of the expansion chuck. Said piston/cylinder system comprises a pressure piston which is guided in a cylinder bore or a sleeve which is optionally inserted into a bore of this type. Simple filling of the pressure chamber of the pressure conducting system and of the pressure generation unit with the pressure medium is achieved by a filling hole which is angled away from the cylinder bore and connects the cylinder bore to the pressure conducting system. In one particularly simple and effective realization, the pressure piston can be actuated by means of a clamping screw.

In one design of the expansion chuck according to the invention which is advantageous, in particular, for mold and die construction, the clamping sleeve is drawn out on the tool side to form an elongate, narrow neck region, the axial length of which is at least four times its external diameter. In particular, the length of the neck region is at least 100 mm.

In one advantageous refinement, the radial extent of the annular gap is at most 0.2 mm, preferably approximately 0.1 mm.

BRIEF DESCRIPTION OF THE DRAWINGS

In the following text, one exemplary embodiment of the invention will be described in greater detail using a drawing, in which:

FIG. 3 shows, in a longitudinal section III-III according to FIG. 2, the expansion chuck there, FIG. 4 shows an enlarged illustration of a detail IV from FIG. 3, FIG. 5 shows, in a cross section V-V according to FIG. 2, the expansion chuck there, and FIG. 6 shows an enlarged illustration of a detail VI from FIG. 5.

Figure 1:
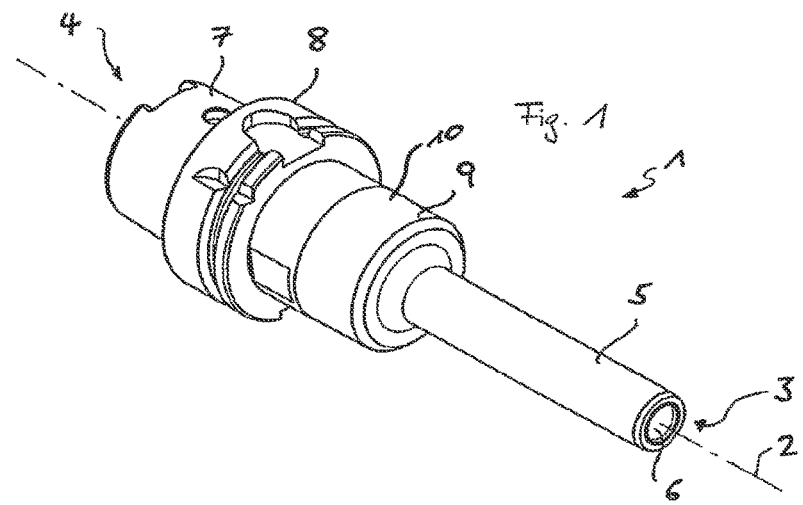
FIG. 1 shows a perspective illustration of a hydraulic expansion chuck for clamping in a tool.

Parts and variables which correspond to one another are always provided with identical designations in all the figures.

DETAILED DESCRIPTION OF THE INVENTION

The (hydraulic) expansion chuck 1 shown in various illustrations in FIGS. 1 to 6 serves to clamp in a rotationally driven tool (not shown), in particular a drill or milling cutter on the drive spindle of a machine tool (likewise not shown). The expansion chuck 1 is substantially rotationally symmetrical configuration with regard to a chuck axis 2 which forms the rotational axis, and has a tool-side end 3 and a machine-side end 4 as viewed in the direction of said chuck axis 2. In the vicinity of the tool-side end 3, the expansion chuck 1 is drawn out to form an elongate and narrow neck region. 5 which has a receptacle 6 for the tool on the free end side, that is to say at the tool-side end 3).

Figure 2:
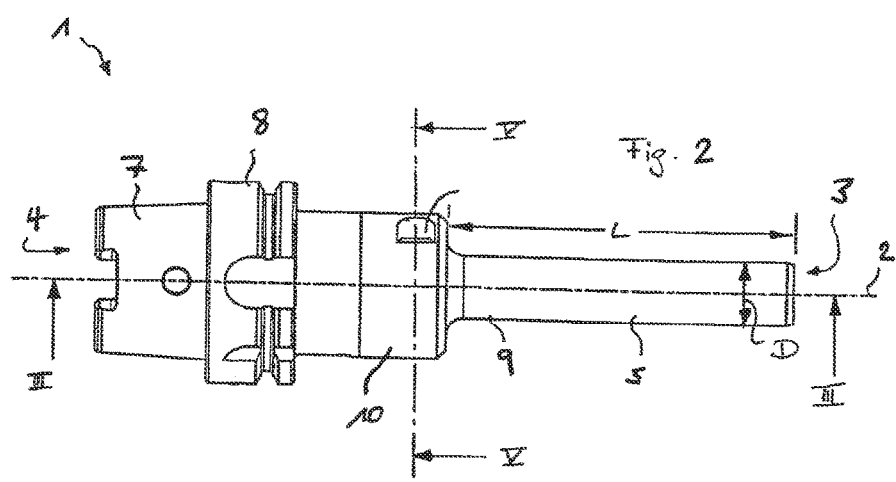
FIG. 2 shows a side view of the expansion chuck according to FIG. 1.

Here, the axial length L (FIG. 2) of the neck region 5 is four times to five times its external diameter (FIG. 2). In a preferred size, the length L of the neck region is approximately 100 mm in the case of an external diameter of 20 mm and an internal diameter d of the receptacle 6 of 12 mm. However, an even longer and/or narrower design of the expansion chuck 1 or an even lower internal diameter d can also be realized. The machine-side end 4 is provided with a shaft, for example configured as an HSC shaft (called fastening cone 7 in the following text), for connection of the expansion chuck 1 on the drive spindle.

As can be seen, in particular, from the sectional illustration according to FIG. 3, the expansion chuck 1 is substantially configured in three pieces. It comprises a basic body 8 which forms the machine-side part of the expansion chuck 1 and on which the fastening cone 7 is also formed. Furthermore, the expansion chuck 1 is formed from an approximately bell-shaped clamping sleeve 9. The clamping sleeve 9 is placed with a widened annular region 10 onto the tool-side end of the basic body 8. The clamping sleeve 9 tapers in a stepped manner toward the tool-side end 3 of the expansion chuck 1 in order to form the narrow neck region 5. In its interior, the clamping sleeve 9 has a through hole 11 which is concentric with respect to the chuck axis 2. As third constituent part of the expansion chuck 1, an inner sleeve 12 (FIG. 2) lies in this through hole 11, which inner sleeve 12 penetrates the through hole 11 over its entire length and projects beyond the machine-side end of said through hole 11 into an axial hole 13 of the basic body 8.

At its tool-side end 3, the inner sleeve 12 is provided with an annular collar 14 which projects radially to the outside from the outer circumference of the inner sleeve 12. As can be seen, in particular, from FIG. 4, said annular collar 14 has a two step contour in longitudinal section, in the course of which the external diameter of the inner sleeve 12 first of all widens in a first step in the direction of the tool-side end 3 to a center region 15, the outer face of which is offset parallel to the circumferential face of the inner sleeve 12. Starting from said center region 15, the annular collar 14 is then widened in a second step toward the tool-side end 3 to form an end section 16 which is widened again.

The annular collar 14 corresponds with a recess 17 at the tool-side end of the through hole 11, which recess 17 is shaped in a complementary manner with respect to said annular collar 14, with the result that the inner sleeve 12 and the clamping sleeve 9 bear sealingly against one another in the region of the annular collar 14 and the recess 17. Therefore, as can be seen, in particular, from FIG. 4, the interface 18 which is formed in that region between the inner sleeve 12 and the clamping sleeve 9 has a profile in longitudinal section which is kinked twice by in each case an angle of approximately 90°. Here, the annular collar 14 extends in the radial direction over the entire width of the clamping sleeve 9, with the result that the end section 16 of the annular collar 14 terminates, radially on the outside, approximately flushly with the outer circumference of the clamping sleeve 9, and the interface 18 opens in the radially outward direction on the circumferential face of the neck region 5. The clamping sleeve 9 and the inner sleeve 12 are brazed to one another in a pressure-tight manner in an outer part section of the interface 18. Toward the machine-side end 4, the clamping sleeve 9 and the inner sleeve 12 are brazed to one another in a pressure-tight manner at the machine-side edge of the through hole 11. Here, an annular groove 20 which is made in the wall of the through hole 11 (FIG. 3) serves as solder flow stop in order to limit the soldered surface.

In its interior, the inner sleeve 12 has a hole which is concentric with respect to the chuck axis 2 and forms the receptacle 6. The inner sleeve 12 is of thin-walled configuration in the region of the receptacle 6. Said thin-walled region of the inner sleeve 12 forms an expansion bushing 21 which can be deformed radially in order to clamp in the tool. The expansion bushing 21 is preferably configured integrally with the inner sleeve 12, but as an alternative can also be formed from a separate part. An approximately hollow-cylindrical void which acts as a pressure chamber 22 is formed in the region of the expansion bushing 21 between the inner wall of the clamping sleeve 9 and the opposite outer wall of the inner sleeve 12. Said pressure chamber 22 merges at the machine-side end of the receptacle 6 into an annular gap 23 which is likewise formed between the inner wall of the clamping sleeve 9 and the outer wall of the inner sleeve 12. Said annular gap 23 has only an extremely small radial extent R (FIG. 6) of preferably 0.1 mm (corresponding to approximately ⅒ of the wall thickness of the expansion bushing 21) and can therefore only be seen as such in enlarged FIGS. 4 and 6 for reasons of the resolution. In the illustration according to FIG. 3, the annular gap 23 can be seen only in outline as a widened black line.

The annular gap 23 extends in the radial direction over a large part of the length of the clamping sleeve 9 between the pressure chamber 22 and a pressure generation unit 24 (FIG. 5), which is accommodated in the widened annular region 10 at the machine-side end of the clamping sleeve 9. Here, the annular gap 23 forms a pressure conducting system which connects the pressure chamber 22 fluidically to the pressure generation unit 24 and therefore makes pressure transmission possible via a liquid pressure medium F, in particular an oil, from the pressure generation unit 24 into the pressure chamber 22.

As is apparent, in particular, from FIG. 5, the pressure generation unit 24 comprises a cylinder bore 25, in which a pressure piston 26 is arranged. The pressure piston 26 is guided adjustably, either directly in the cylinder bore 25 or, as shown in FIG. 5, in a sleeve 27 which is inserted into the cylinder bore 25. The pressure piston 26 can be actuated by means of a clamping screw 28. In the embodiment shown, the pressure piston 26 and the clamping screw 28 are an integral component. Here, said component is provided with an external, thread which meshes with an internal thread of the sleeve 27. The inner end of the pressure piston 26 carries a seal 29 made from an elastic material, in particular a rubber elastomer. Furthermore, the pressure generation unit 24 comprises a filling hole 30 which extends angled away from an inner end of the cylinder bore 25 in such a way that it is approximately tangent on the annular gap 23. The filling hole 30 is therefore connected fluidically both to the cylinder bore 25 and, via a connecting groove 31, to the annular groove 23. The filling hole 30 is closed in a pressure-tight manner with respect to the external world by a spherical seal 32.

During assembly, the inner sleeve 12 is pushed into the clamping sleeve 9 from the tool-side end 3. After this, the basic body 8 is attached to the assembly which is formed from the clamping sleeve 9 and the inner sleeve 12. Subsequently, in turn, the inner sleeve 12 is brazed in a pressure-tight manner to the clamping sleeve 9 and the basic body 8. As an alternative, the clamping sleeve 9 is shrunk onto the basic body 8. To safeguard the connection, which is formed between the basic body 8 and the clamping sleeve 9, against rotation, a key pin 33 (FIG. 3) is additionally inserted during mounting into aligned eccentric holes of the basic body 8 and the clamping sleeve 9.

Before the expansion chuck 1 is commissioned, first of all the common volume of the pressure cylinder 25, the filling hole 30, the annular gap 23 and the pressure chamber 22 is filled completely with the liquid pressure medium F via the open filling hole 30. In order to avoid air bubbles in the pressure system, this takes place under vacuum. After filling, the filling hole is closed in a pressure-tight manner by the spherical seal 32.

In order to clamp in a tool which is inserted into the receptacle 6, the clamping screw 28 and therefore the pressure piston 26 in the cylinder bore 25 can then be screwed in by means of a screwdriver. As a result, the volume of the cylinder bore 25 which is filled with the pressure medium F is reduced, as a result of which in turn a hydrostatic pressure of typically up to 1000 bar can be applied to the pressure medium F. This pressure is transmitted via the annular gap 23 which acts as pressure conducting system as far as into the region of the pressure chamber 22. Here, the hydrostatic pressure brings about a deformation of the thin-walled expansion bushing 21, which deformation is directed radially onto the chuck axis 2 and by way of which the inserted tool is clamped in the receptacle 6.

In order to remove the tool out of the expansion chuck, the pressure piston 26 is reset again by a few revolutions of the clamping screw 28, as a result of which the pressure medium F is relieved. Here, the elastically deformed expansion bushing 21 assumes its original shape again, with the result that the tool can be removed.

Furthermore, the expansion chuck 1 comprises an actuating journal 34 (FIG. 3) for adjusting the tool axially in the receptacle 6. The actuating journal 34 is provided with an external thread at least in a part region of its circumferential face, which external thread meshes with an internal thread of a hole 35 at the bottom of the receptacle 6. When the tool is removed, the actuating journal 34 can be adjusted in the axial direction by means of a screwdriver which is introduced into the receptacle 6. Along the chuck axis 2, the expansion chuck 1 is penetrated completely by a leadthrough which is formed by aligned holes of the inner sleeve 12, of the actuating journal 34 and of the basic body 8. This leadthrough which is concentric with respect to the chuck axis 2 can be used, in particular, as a coolant channel. During the operation of the expansion chuck 1, coolant can be guided through said coolant channel from the machine tool into the region of the receptacle, and therefore into the region of the tool.

The invention claimed is:

1. An expansion chuck having a tool-side end and a machine-side end, a shaft for clamping the expansion chuck in a machine tool being arranged at the machine-side end, and an expansion bushing which is surrounded by a pressure chamber being arranged at the tool-side end, which expansion bushing can be deformed radially in order to clamp in a tool, under the action of a pressure medium which is accommodated in the pressure chamber, the machine-side end of the expansion chuck being formed by a basic body which carries the shaft on a machine-side end of the basic body and to which, on an opposite tool-side end of the basic body, a clamping sleeve which delimits the outside of the pressure chamber is attached rigidly and extends outward away from the basic body,
    wherein an inner sleeve which is separate both from the clamping sleeve and from the basic body is disposed in the interior of the clamping sleeve and in an axial hole defined by the basic body, which inner sleeve contains the expansion bushing and delimits the inside of the pressure chamber, the inner sleeve having, at its tool-side end, a radially outwardly protruding annular collar which protrudes beyond an inner circumference of the clamping sleeve and which overlaps with the clamping sleeve with the result that the interface opens into the outer circumference of the expansion chuck, wherein the basic body and the clamping sleeve are distinct members, initially formed separately and subsequently rigidly attached,
    wherein the clamping sleeve has a through hole and wherein the inner sleeve is disposed in the through hole and penetrates the through hole over its entire length,
    wherein the inner sleeve projects beyond a machine-side end of the through hole into an axial hole of the basic body, the axial hole extending from a face disposed on the tool-side end of the basic body adjacent the clamping sleeve toward the machine-side end of the basic body,
    wherein, in longitudinal section, the annular collar has an at least two step contour at the tool side end, a first contour widening an external diameter of the inner sleeve in the direction of the tool-side end, and a second contour widening the external diameter a second time to form an end section of the inner sleeve at the tool-side end, and
    wherein the two step contour interacts with a substantially complementarily shaped recess at the tool-side edge of the clamping sleeve in order to form an interface which is kinked at least twice in longitudinal section.

2. The expansion chuck as claimed in claim 1, wherein the interface is kinked at least twice by in each case approximately 90° in longitudinal section.

3. The expansion chuck as claimed in claim 1, wherein the clamping sleeve is soldered to the inner sleeve at least in a part region of the interface.

4. The expansion chuck as claimed in claim 1, wherein the clamping sleeve has, on the tool side, an elongate, narrow neck region, the axial length of which is at least four times its external diameter.

5. The expansion chuck as claimed in claim 4, wherein the axial length of the neck region is at least 100 mm.

6. An expansion chuck comprising:
    a basic body disposed about a central axis having a first end and an opposite second end, the first end structured to be coupled to a drive spindle of a machine tool;
    a clamping sleeve having disposed about the central axis having a first end and an opposite second end, the first end of the clamping sleeve being attached to the second end of the basic body, the clamping sleeve further including a through hole which is concentric with respect to the central axis and extends from the first end to the second end of the clamping sleeve; and
    an inner sleeve disposed in, and penetrating the through hole over the entire length of the through hole and projecting beyond the first end of the clamping sleeve into an axial hole formed in the second end of the basic body, the inner sleeve comprising a receptacle formed adjacent the second end of the clamping sleeve, the receptacle structured to receive a portion of a cutting tool, wherein the basic body and the clamping sleeve are distinct members, initially formed separately and subsequently rigidly attached; and wherein the inner sleeve protrudes beyond an inner circumference of the clamping sleeve at the tool-side end of the inner sleeve; and wherein the clamping sleeve has, on the tool side, an elongate, narrow neck region, the axial length of which is at least four times its external diameter.

7. The expansion chuck as claimed in claim 6, wherein the first end of the basic body comprises a fastening cone which is structured to be coupled to the drive spindle of the machine tool.

8. The expansion chuck as claimed in claim 6, wherein the clamping sleeve comprises a widened annular region adjacent the first end of the clamping sleeve and a narrow neck region extending from the widened annular region toward the second end of the clamping sleeve.

9. An expansion chuck comprising:

a basic body disposed about a central axis having a first end and an opposite second end, the first end structured to be coupled to a drive spindle of a machine tool;

a clamping sleeve having disposed about the central axis having a first end and an opposite second end, the first end of the clamping sleeve being attached to the second end of the basic body, the clamping sleeve further including a through hole which is concentric with respect to the central axis and extends from the first end to the second end of the clamping sleeve; and an inner sleeve disposed in, and penetrating the through hole over the entire length of the through hole, projecting beyond the second end of the clamping sleeve and projecting beyond the first end of the clamping sleeve into an axial hole formed in the second end of the basic body, the inner sleeve comprising a receptacle formed adjacent the second end of the clamping sleeve, the receptacle structured to receive a portion of a cutting tool, wherein the basic body and the clamping sleeve are distinct members, initially formed separately and subsequently rigidly attached, wherein the inner sleeve engages the basic body in a positively locking manner.

* * * * *